Figure 1:
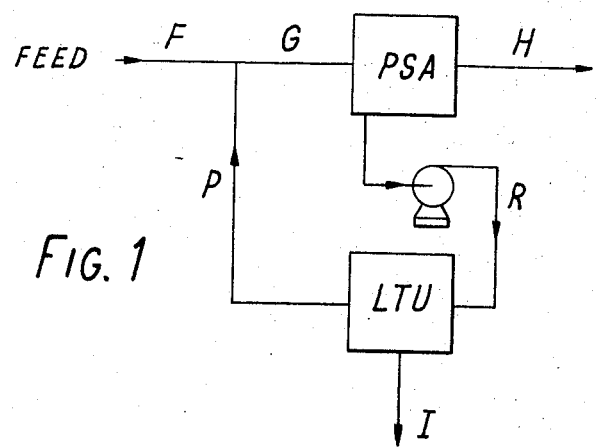

United States Patent
Doherty

[11] 3,838,553
[45] Oct. 1, 1974

[54] SEPARATION OF MIXTURES ESPECIALLY GAS MIXTURES

[75] Inventor: Keith Stanley Doherty, Cheadle, England

[73] Assignee: Petrocarbon Developments Limited, Manchester, England

[22] Filed: Apr. 12, 1972

[21] Appl. No.: 243,343

[30] Foreign Application Priority Data
Apr. 20, 1971  Great Britain .................... 10189/71

[52] U.S. Cl. ............................ 55/58, 55/66, 55/68
[51] Int. Cl. .......................................... B01d 53/04
[58] Field of Search .............. 55/58, 62, 25, 75, 66, 55/68, 33, 179, 208

[56]  References Cited
UNITED STATES PATENTS

| | | | |
|---|---|---|---|
| 2,885,356 | 5/1959 | Fisher | 55/25 |
| 3,085,379 | 4/1963 | Kiyonaga et al. | 55/62 |
| 3,140,931 | 7/1964 | McRobbie | 55/25 |
| 3,359,744 | 12/1967 | Bolez et al. | 55/62 |
| 3,540,188 | 11/1970 | Barrere | 55/62 |
| 3,619,984 | 11/1971 | Domine et al. | 55/25 |

Primary Examiner—Charles N. Hart
Attorney, Agent, or Firm—Cushman, Darby & Cushman

[57]  ABSTRACT

A method of separating a light gas, especially hydrogen or helium, in both high purity and high yield from a gaseous mixture containing it by utilizing both a low temperature separator unit and a pressure swing adsorber with recompression of the regenerating stream from the latter and recycle of the recompressed stream to the low temperature separator unit.

10 Claims, 2 Drawing Figures

SEPARATION OF MIXTURES ESPECIALLY GAS MIXTURES

This invention relates to a process for the separation of components from mixtures thereof, and is particularly applicable to the separation of gas mixtures, especially those containing a very light gas e.g., hydrogen or helium.

It is frequently desirable to recover a light gas, e.g., hydrogen or helium, at various levels of purity from a multi-component gas stream containing it. In the case of hydrogen, hydrogen-containing streams used as sources for hydrogen-rich product streams include purge gas streams from synthesis processes e.g., the synthesis of ammonia, and streams produced by the controlled combustion or reforming of hydrocarbon fuels or by the cracking of hydrocarbon feedstocks. In the case of helium, helium-containing streams used as sources for helium-rich product streams include natural gas compositions.

One well known method of separating a stream rich in a desired light gas from a gas stream containing said light gas is by condensing out the other (heavier) component or components.

Processes utilizing this method are carried out in low temperature separator units where the heavier component or components is or are at least partially condensed by subjecting the gas stream at an elevated pressure, generally 100 to 800 p.s.i.g. (pounds per square inch gauge) to low temperatures in a heat exchanger, and a stream rich in the desired light gas is separated from the condensed material. Such processes are described, for example, in *The Chemical Engineer* 1965, Volume 187 pasges CE 87 onwards and in British Patent Specification 1,136,040.

A disadvantage of such low temperature separation processes is that the temperature to which the stream may be cooled is limited by the freezing point of one or another of the constituents; as a result of which the purity of the resulting light gas is generally not as high as it desired for some applications. For example, in the case of hydrogen, the purity is generally not higher than 95 to 98 percent depending on the nature of the other components with which it is associated and the operating conditions used. Though the hydrogen purity can be increased by known additional treatment, this procedure is cumbersome and costly.

Another known method for obtaining a stream rich in light gas from a stream containing said light gas is by subjecting the latter stream to pressure-swing absorption, also known as heatless adsorption. In this method the feed stream is passed at an elevated pressure through a pressure swing adsorber which comprises equipment including two or more adsorbent chambers, containing molecular sieves or other adsorbents for the heavier component or components of the gas stream, piped and valved to operate in sequence through (a) adsorption, wherein the heavier component or components is or are separated from the light gas by adsorption by the molecular sieve or other adsorbents, and (b) desorption wherein the adsorbed materials are stripped from the adsorbent to regenerate the adsorbent for re-use. The stripping is effected by returning part of the product stream at a lower pressure back through the adsorbent as a regenerating gas stream under virtually isothermal conditions; the fraction of the product stream being used for this purpose being a function of the difference in pressure between adsorption and desorption, higher pressure differences requiring smaller recycle streams. Two or more beds of adsorbent are used so that while the gas to be treated is being passed over one bed, another bed is being regenerated. Processes utilising this method are described, for example, at page 78 of the 13th November 1967 issue of the *Oil and Gas Journal* and at page 78 of issue No. 9 of Volume 65 of *Chemical Engineering progress* (1969).

When the components associated with the light gas consist of such gases as nitrogen, carbon monoxide and/or methane, the residual impurities in the purified product stream can be reduced to a few parts per million whereby a very pure light gas stream can be obtained. However, since a part, and usually a substantial part, of the very pure stream is required for use as the regenerating stream, significant amounts of product are lost so that, for example, in the case of hydrogen the ultimate recovery is generally within the limits of 50 to 80 percent.

Moreover, the components stripped from the adsorbent by the regenerating gas stream cannot be recovered from the said regenerating gas stream exiting from the pressure swing adsorber and it is generally rejected.

We have now developed a method of separating a light gas in high purity and in high yield from a multi-component gas stream containing it. The method involves the use of a low temperature separator unit and a pressure swing adsorber and involves recycling between the two a stream of gas in which the concentration of the desired light gas lies between that of the multi-component gas stream and the high purity light gas product stream, recycle being either a partially purified light gas stream obtained from the low temperature separator or the regenerating stream exiting from the pressure swing adsorber, depending on the concentration of light gas in the multi-component gas stream.

In accordance with the invention, there is provided a method of recovering a light gas in both high yield and high purity from a multi-component gas stream containing it, which method comprises:

feeding the multi-component gas stream at elevated pressure to either one of (a) a low temperature separator unit from which a light gas stream of improved purity is recovered and (b) a pressure swing adsorber to which said light gas stream of improved purity is fed and from which a high purity light gas stream is recovered, recycling a part of the high purity light gas stream from the pressure swing adsorber as a regenerating stream to the pressure swing adsorber at a reduced pressure, compressing the regenerating stream exiting from the pressure swing adosrber to elevated pressure and feeding it to the low temperature separator unit, and recovering another part of the high purity light gas stream as a final product stream.

The method of the present invention has the additional advantage of permitting the recovery of a second gas stream which is substantially free of the light gas, this being a feature which is not possible if either the low temperature separator unit or the pressure swing adsorber is used on its own since the waste stream from the former and the regenerating stream from the latter both contain substantial quantities of light gas. With the present method, however, a second product stream can be obtained from the low temperature unit which is substantially free of the light gas. Thus, where the multi-component gas stream is a binary mixture, the method of the invention permits the production of the two components in high purity and high yield.

Yet another advantage of the invention is that the pressure swing adsorber operates very satisfactorily at ambient temperatures and it is not, therefore, necessary to incorporate it in a cold box with all the consequent technical difficulties and economic disadvantages.

The choice of to which of the low temperature separator unit and the pressure swing adsorber the multi-component gas stream is fed depends on the concentration of the light gas in said gas stream. Where the concentration of the light gas is higher in the feed gas stream than in the regenerating stream exiting from the pressure swing adsorber, the feed will be to the adsorber; where it is lower, the feed will be to the low temperature separator unit.

In either case, the stream being recycled from the other unit (that is the unit other than that to which the multi-component gas stream is being fed) may be combined with said multi-component gas stream for feeding to the system.

For feeding to the system, the multi-component gas stream is at elevated pressure, generally of from about 50 to 800 p.s.i.g. and preferably from about 300 to 500 p.s.i.g. Low temperature separator units conventionally operate with inlet pressures at between 100 and 800 p.s.i.g. and exit pressures of slightly less than the inlet pressure. The pressure swing adsorber will operate very satisfactorily with an inlet pressure approximately equal to the outlet pressure of the low temperature separator unit and at ambient or close to ambient temperatures so that in general it is not found necessary to adjust either the temperature or pressure of the first product stream from the low temperature separator unit before feeding it to the pressure swing adsorber.

The pressure of the high purity light gas stream recovered from the pressure swing adsorber will be slightly below the inlet pressure to the adsorber, e.g., from about 25 to about 750 p.s.i.g. The part of this stream that is separated for use as the regenerating stream is expanded to a lower pressure before recycling through the adsorbent chambers and the lower pressure is conveniently about atmospheric pressure. Subsequent to passing through the adsorbent chamber and stripping the adsorbed gas from the adsorbent, this regenerating stream is re-compressed to a pressure suitable for feeding it to the low temperature unit.

Figure 2:
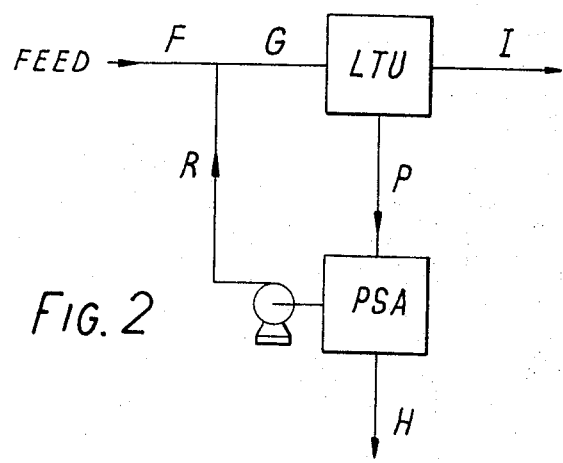

Two arrangements according to the invention are illustrated in FIGS. 1 and 2 of the accompanying drawings in which the relevant streams are labelled as follows:

$F$ = Feed mixture comprising light gas plus impurity
$G$ = Feed + Re-cycle
$H$ = Light gas product of high purity
$I$ = Impurity substantially free of light gas
$R$ = Regeneration Gas
$P$ = Partially Purified light gas When applied to hydrogen separation the invention can be operated to recoever a very high proportion of the hydrogen at very high purity. Moreover, substantially all of the impurity can be recovered separately and virtually free of hydrogen. Furthermore, the process is economical to operate since the consumption of utilities is low.

The process is also very flexible and adaptable to separate compositions of widely varying nature.

The concept of the invention is also adaptable broadly to other product recovery procedures where a product may be recovered from a mixture by one of two alternative methods, the first of which (method A) provides product of relatively high purity but involves some loss of product through having to pass a part thereof back through the separator as a regeneration stream for the separator unit to strip the impurity withdrawn from the feed stream by the separator, and thence to waste, and the second of which (method B) does not require this product loss but results in product streams of relatively less high purity.

In accordance with this broader aspect of the invention, the process comprises using a combination of the two methods with a recycle of the material having a product content intermediate the feed stream and the desired product stream between the two methods, said recycle stream being either the regeneration stream from the method giving product of relatively high purity or the product-containing stream from the method giving product of relatively less high purity.

The invention may be illustrated by the following Examples, Examples 1 and 2 show the separation of a gas stream consisting of hydrogen and nitrogen. For simplicity of the arithmatic, the individual gases are shown as being recovered at 100 percent purity although in practice the hydrogen stream '$H$' will contain a few parts per million of nitrogen, the actual amount being a function of the operating conditions chosen, and the nitrogen stream '$I$' will contain a small quantity of hydrogen e.g., about 0.5 percent the actual value of which will also depend on the operating conditions. Example 3 illustrates the application of the invention to the recovery of helium of high purity.

EXAMPLE 1

This example illustrates the recovery of hydrogen and nitrogen from a feed gas having a 90/10 hydrogen-to-nitrogen composition by volume using the process illustrated in FIG. 1 of the drawings. The feed stream to the pressure swing adsorber was at 39 atmospheres and ambient temperature, the regenerating stream for the pressure swing adsorber was expanded to about 5 p.s.i.g. and then recompressed to 40 atmospheres for feeding to the low temperature unit. The feed to the low temperature unit was at ambient temperature and cooling was to 66°K. The recycle to the pressure swing adsorber was at feed pressure. Composition and flow rate of each of the various streams is as follows:

| | | M% | SCFH | | | M% | SCFH | | | M% | SCFH |
|---|---|---|---|---|---|---|---|---|---|---|---|
| F | $H_2$ | 90 | 900 | G | $H_2$ | 91 | 1166 | H | $H_2$ | 100 | 900 |
| | $N_2$ | 10 | 100 | | $N_2$ | 9 | 114 | | $N_2$ | 0 | 0 |
| | | 100 | 1000 | | | 100 | 1280 | | | 100 | 900 |
| | | M% | SCFH | | | M% | SCFH | | | M% | SCFH |
| I | $H_2$ | 0 | 0 | P | $H_2$ | 95 | 266 | R | $H_2$ | 70 | 266 |
| | $N_2$ | 100 | 100 | | $N_2$ | 5 | 14 | | $N_2$ | 30 | 114 |
| | | 100 | 100 | | | 100 | 280 | | | 100 | 380 |

EXAMPLE 2

This example illustrates the recovery of hydrogen and nitrogen from a feed gas having a 60/40 hydrogen-to-nitrogen composition by volume using the process illustrated in FIG. 2 of the drawings. The feed was at 40 atmospheres and ambient temperature and cooling to 66°K was effected in the low temperature unit. The hydrogen-rich stream was fed to the pressure swing adsorber at 39 atmospheres and ambient temperature and the regenerating gas for the adsorber was expanded to about 5 p.s.i.g. and then recompressed to 40 atmospheres for recycle to the low temperature unit. The composition and flow rate of each of the various streams is as follows:

|   |       | M%    | SCFH  |   |       | M%    | SCFH  |   |       | M%    | SCFH  |
|---|-------|-------|-------|---|-------|-------|-------|---|-------|-------|-------|
| F | $H_2$ | 60    | 600   | G | $H_2$ | 63.3  | 760   | H | $H_2$ | 100   | 600   |
|   | $N_2$ | 40    | 400   |   | $N_2$ | 36.7  | 440   |   | $N_2$ | 0     | 0     |
|   |       | 100   | 1000  |   |       | 100.0 | 1200  |   |       | 100   | 600   |
|   |       | M%    | SCFH  |   |       | M%    | SCFH  |   |       | M%    | SCFH  |
| I | $H_2$ | 0     | 0     | P | $H_2$ | 95    | 760   | R | $H_2$ | 80    | 160   |
|   | $N_2$ | 100   | 400   |   | $N_2$ | 5     | 40    |   | $N_2$ | 20    | 40    |
|   |       | 100   | 400   |   |       | 100   | 800   |   |       | 100   | 200   |

Whereas the processes of the invention, have been illustrated in the above two Examples with particular reference to the recovery of hydrogen, e.g., from mixtures thereof with nitrogen, carbon monoxide and/or methane, the invention is also applicable to the separation of other gas mixtures. The recovery of helium from mixtures with e.g., methane and/or nitrogen may be mentioned in particular and is illustrated in the following Example.

EXAMPLE 3

This example illustrates the recovery of helium from a typical Helium-Nitrogen mixture as would emerge as a side-stream from a plant to upgrade a helium-bearing lean natural gas. The regeneration stream R will contain a higher percentage of helium than the feed gas and the process used is that shown in FIG. 2, i.e., the feed, together with the recycle stream will pass first to the low temperature unit. The feed to the system was at 25 atmospheres and ambient temperature and cooling to 66°K was effected in the low temperature unit. The partially purified helium stream from the low temperature unit was fed to the pressure swing adsorber at about 24 atmospheres and ambient temperature and the regenerating stream for the latter was expanded to about 5 p.s.i.g. and then recompressed to 25 atmospheres for recycle to the low temperature unit. The composition and flow rate of each of the various streams is as follows. Whereas for simplicity the helium stream 'H' is shown as containing 100 percent helium it will in practice contain a few parts per million of nitrogen, the actual amount being a function of the operating conditions.

|   |       | M%  | SCFH |   |       | M%  | SCFH |   |       | M%  | SCFH |
|---|-------|-----|------|---|-------|-----|------|---|-------|-----|------|
| F | He    | 88  | 880  | G | He    | 89  | 1102 | H | He    | 100 | 878  |
|   | $N_2$ | 12  | 120  |   | $N_2$ | 11  | 140  |   | $N_2$ | 0   | 0    |
|   |       | 100 | 1000 |   |       | 100 | 1242 |   |       | 100 | 878  |
| I | He    | 2   | 2    | P | He    | 98  | 1100 | R | He    | 92  | 222  |
|   | $N_2$ | 98  | 120  |   | $N_2$ | 2   | 20   |   | $N_2$ | 8   | 20   |
|   |       | 100 | 122  |   |       | 100 | 1120 |   |       | 100 | 242  |

I claim:

1. A method of recovering a light gas in both high yield and high purity from a multicomponent gas stream containing the light gas with a heavier component, which method comprises:

feeding the multi-component gas stream at elevated pressure to a low temperature separator unit from which a light gas stream of improved purity is recovered, feeding the light gas stream of improved purity to a pressure swing adsorber and recovering therefrom a high purity light gas stream, recycling a part of the high purity light gas stream from the pressure swing adsorber as a regenerating stream to the pressure swing adsorber at a reduced pressure, compressing the regenerating stream exiting from the pressure swing adsorber to elevated pressure and feeding it to the low temperature separator unit, recovering another part of the high purity light gas stream from said pressure swing adsorber as a final product stream and recovering a further stream containing said heavier component and which is substantially free of the light gas, from the low temperature separator unit.

2. A method as claimed in claim 1 in which the concentration of light gas is higher in the regenerating stream exiting from the pressure swing adsorber than in the multi-component gas stream and the multi-component gas stream is fed to the low temperature separator unit.

3. A method as claimed in claim 1 in which the light gas is hydrogen or helium.

4. A method as claimed in claim 3 in which the light gas is hydrogen and the multi-component gas stream also includes at least one of nitrogen, carbon monoxide and methane.

5. A method as claimed in claim 3 in which the light gas is helium and the multi-component gas stream also includes methane or nitrogen or both.

6. Equipment for recovering a light gas in both high yield and high purity from a multi-component gas stream, said equipment comprising:
- a low temperature separator unit having a feed gas inlet, a first gas outlet for a stream rich in light gas, and a second gas outlet;
- a pressure swing adsorber having a feed gas inlet and a gas outlet;
- a compressor having a gas inlet and a gas outlet;
- means for feeding a multi-component gas stream under elevated pressure to the inlet of low temperature separator unit,
- means for feeding the stream rich in light gas from said first gas outlet of the low temperature separator unit to the inlet of the pressure swing adsorber,
- means for recovering a high purity light gas stream from the outlet of the pressure swing adsorber,
- means for recycling a part of said high purity light gas stream as a regenerating stream at reduced pressure to the pressure swing adsorber,
- means for feeding the regenerating stream exiting from the pressure swing adsorber to the compressor inlet,
- means for feeding the compressed regenerating stream from the compressor outlet to the inlet of the low temperature separator unit, and optionally
- means for recovering a gas stream substantially free of light gas from the second outlet of the low temperature separator unit.

7. A method of recovering a light gas in both high yield and high purity from a multi-component gas stream containing the light gas with a heavier component, which method comprises utilizing both a low temperature separator unit and a pressure swing adsorber for said recovery by:
- feeding the multi-component gas stream at elevated pressure to the pressure swing adsorber, recovering a light gas stream of improved purity from the low temperature separator unit, feeding the recovered light gas stream of improved purity to said pressure swing adsorber, recovering a high purity light gas stream from said pressure swing adsorber,
- recycling a part of the high purity light gas stream from the pressure swing adsorber as a regenerating stream to the pressure swing adsorber at a reduced pressure,
- compressing the regenerating stream exiting from the pressure swing adsorber to elevated pressure and feeding it to the low temperature separator unit,
- recovering another part of the high purity light gas stream from said pressure swing adsorber as a final product stream and recovering a further stream containing said heavier component and which is substantially free of the light gas, from the low temperature separator unit.

8. A method as claimed in claim 7 in which the concentration of light gas is higher in the multi-component gas stream than in the regenerating stream exiting from the pressure swing adsorber and the multi-component gas stream is fed to the pressure swing adsorber.

9. A method as claimed in claim 7 wherein the light gas is hydrogen or helium and the multi-component gas stream also includes at least one of nitrogen, carbon monoxide and methane.

10. Equipment for recovering a light gas in both high yield and high purity from a multi-component gas stream, said equipment comprising:
- a low temperature separator unit having a feed gas inlet, a first gas outlet for a stream rich in light gas, and a second gas outlet;
- a pressure swing adsorber having a feed gas inlet and a gas outlet;
- a compressor having a gas inlet and a gas outlet;
- means for feeding a multi-component gas stream under elevated pressure to the inlet of the pressure swing adsorber,
- means for feeding the stream rich in light gas from said first gas outlet of the low temperature separator unit to the inlet of the pressure swing adsorber,
- means for recovering a high purity light gas stream from the outlet of the pressure swing adsorber,
- means for recycling a part of said high purity light gas stream as a regenerating stream at reduced pressure to the pressure swing adsorber,
- means for feeding the regenerating stream exiting from the pressure swing adsorber to the compressor inlet,
- means for feeding the compressed regenerating stream from the compressor outlet to the inlet of the low temperature separator unit, and optionally
- means for recovering a gas stream substantially free of light gas from the second outlet of the low temperature separator unit.

* * * * *